US011443327B2

(12) United States Patent
Lamba et al.

(10) Patent No.: US 11,443,327 B2
(45) Date of Patent: Sep. 13, 2022

(54) METHOD AND APPARATUS FOR IMPLEMENTING A BLOCK CHAIN NODE DEVICE

(71) Applicant: JPMorgan Chase Bank, N.A., New York, NY (US)

(72) Inventors: Poonam Lamba, Frisco, TX (US); Benjamin H. Sansom, Little Elm, TX (US); Phani M. Pamarthi, Frisco, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 327 days.

(21) Appl. No.: 16/541,729

(22) Filed: Aug. 15, 2019

(65) Prior Publication Data

US 2020/0074477 A1    Mar. 5, 2020

Related U.S. Application Data

(60) Provisional application No. 62/724,055, filed on Aug. 29, 2018.

(51) Int. Cl.
*G06Q 30/00* (2012.01)
*G06F 16/23* (2019.01)
*G06F 16/27* (2019.01)

(52) U.S. Cl.
CPC ....... *G06Q 30/018* (2013.01); *G06F 16/2379* (2019.01); *G06F 16/27* (2019.01); *G06Q 2220/00* (2013.01)

(58) Field of Classification Search
CPC ............ G06Q 30/018; G06Q 2220/00; G06Q 20/3829; G06Q 20/389; G06F 16/27; G06F 16/2379
(Continued)

(56) References Cited

U.S. PATENT DOCUMENTS 10,417,217 B2 * 9/2019 Pierce ................... H04L 9/3268
2018/0005186 A1 * 1/2018 Hunn .................... G06F 21/645
(Continued)

OTHER PUBLICATIONS

Akmeemana, Chami, Using Blockchain to Solve Regulatory and Compliance Requirements, Medium.com [online], published on Jan. 23, 2017, available at: < https://medium.com/@akme_c/using-blockchain-to-solve-regulatory-and-compliance-requirements-16290f4b4ac1 > (Year: 2017).*
(Continued)

*Primary Examiner* — Richard W. Crandall
(74) *Attorney, Agent, or Firm* — Greenblum & Bernstein, P.L.C.

(57) ABSTRACT

Various methods, apparatuses/systems, and media for implementing a block chain node device are disclosed. A processor allows hosting a received smart contract on a block chain ledger. The smart contract includes a digital model of a contract that describes base policy between an organization and a client. A receiver receives a side car contract from an external database. The side car contract includes a digital addendum to the smart contract and one or more modifications to one or more terms of the contract according to one or more regulatory provisions. The processor attaches the side car contract to the smart contract, and causes a graphical user interface (GUI) to report the one or more terms of the contract according to the one or more modifications in the side car contract in response to one or more received requests to thereby facilitate compliance with the regulatory provisions.

18 Claims, 7 Drawing Sheets

(58) Field of Classification Search
USPC .................................................. 705/311, 317
See application file for complete search history.

(56) References Cited

U.S. PATENT DOCUMENTS

| | | | | |
|---|---|---|---|---|
| 2018/0227116 | A1* | 8/2018 | Chapman | H04L 9/0643 |
| 2018/0268491 | A1* | 9/2018 | Cuomo | G06Q 40/12 |
| 2018/0343175 | A1* | 11/2018 | Bathen | G06F 16/134 |
| 2019/0312855 | A1* | 10/2019 | Sharma | G06F 16/1834 |
| 2019/0392536 | A1* | 12/2019 | Rice | H04L 9/0643 |

OTHER PUBLICATIONS

Moyce, Cliff, "How Blockchain Can Revolutionize Regulatory Compliance," published on Aug. 1, 2016, available at: < https://www.corporatecomplianceinsights.com/blockchain-regulatory-compliance/ > (Year: 2016).*

* cited by examiner

METHOD AND APPARATUS FOR IMPLEMENTING A BLOCK CHAIN NODE DEVICE

CROSS-REFERENCE TO RELATED APPLICATIONS

This application claims the benefit of U.S. Provisional Patent Application Ser. No. 62/724,055 filed Aug. 29, 2018, which is hereby incorporated by reference in its entirety.

TECHNICAL FIELD

This disclosure generally relates to block chain node devices, and, more particularly, to methods and apparatuses for implementing block chain node devices for implementing contracts as blockchain smart contracts for linking/attaching verifiable regulatory rules to the contracts to ensure regulatory compliance in an efficient manner.

BACKGROUND

Today, many financial institutions often pay a large amount of fine for accidental violations of regulatory provisions, such as regulatory provisions implemented by the Servicemembers Civil Relief Act (SCRA). Such violations of regulatory violations may often impact many service members and their families. The violations may be caused due to a lack of systematic SCRA awareness in handling SCRA based contracts, e.g., mortgages by the financial institutions. The issue of implementing regulatory guidance to contracts may not be limited to the SCRA use case. Any regulator could at any time require a change in the treatment of a contract that must be complied with. Conventionally, such compliance often depends solely on manual processing which may result in errors. Further, such conventional technique may often prove be time consuming thereby wasting of computer resources that could be otherwise utilized in other processes.

SUMMARY

The present disclosure, through one or more of its various aspects, embodiments, and/or specific features or sub-components, provides, among others, various systems, servers, devices, methods, media, programs, and platforms for implementing a block chain node device including a block chain node module that may be configured for implementing contracts as block chain smart contract and linking/attaching side car contract (e.g., verifiable regulatory rules) to the smart contract, thereby reducing utilization of computer resources and ensuring regulation compliance in an automatic and efficient manner, but the disclosure is not limited thereto.

The present disclosure, through one or more of its various aspects, embodiments, and/or specific features or sub-components, further provides, among others, various systems, servers, devices, methods, media, programs, and platforms for implementing a block chain node device including a block chain node module that may be configured for implementing contracts as block chain smart contract and linking/attaching side car contract (e.g., verifiable regulatory rules) to the smart contract, thereby reducing authentication data overhead, eliminating human error from decision making process, allowing institutions to systematically integrate with each other to exchange necessary information, and providing a platform for compliance with regulations that would be easily provable through trusted, verifiable, and auditable nature of the block chain architecture of the smart contract and the side car contract, but the disclosure is not limited thereto.

According to an aspect of the present disclosure, a method for implementing a block chain node device for facilitating regulatory compliance for contracts by utilizing one or more processors and one or more memories is disclosed. The method may include: establishing a link between an external database external to a block chain node device managed and operated by an organization and a local database via a communication network; receiving a smart contract from the local database, the smart contract comprising a digital model of a contract that describes base policy between the organization and a client; hosting the received smart contract on a block chain ledger; receiving a side car contract from the external database, the side car contract comprising a digital addendum to the smart contract and one or more modifications to one or more terms of the contract according to one or more regulatory provisions; attaching the side car contract to the smart contract; and causing a graphical user interface (GUI) to report the one or more terms of the contract according to the one or more modifications in the side car contract in response to one or more received requests to thereby facilitate compliance with the regulatory provisions.

According to another aspect of the present disclosure, the method may further include: determining when one or more of the modifications should be updated based on one or more blocks added to the block chain ledger corresponding to new regulatory provisions received from the external database; recording one or more updates to the one or more of the modifications based on the determination that one or more of the modifications should be updated; and causing the graphical user interface (GUI) to report the one or more terms of the contract according to the updated one or more modifications in the side car contract in response to one or more received requests to thereby facilitate compliance with the new regulatory provisions.

According to a further aspect of the present disclosure, the method may further include: establishing a link between a plurality of block chain devices; and synchronizing the plurality of block chain devices with the updated one or more modifications in the side car contract.

According to yet another aspect of the present disclosure, the external database may be embedded within an authority data source that stores regulatory provisions, and the method may further include: obtaining the side car contract from the authority data source, wherein the side car contract is programmatically configured to: obtain entitlement data from the authority data source via the communication network; and determine when the one or more modifications should be updated based on the obtained entitlement data.

According to a further aspect of the present disclosure, the entitlement data may include identification data that validates contract data of the smart contract. According to exemplary embodiments, the identification data may include last name, first name, social security number, or any other identification information that identifies a client to the contract.

According to another aspect of the present disclosure, the side car contract may include built-in intelligence to implement the one or more modifications programmatically as rules based on data collected from the external database.

According to yet another aspect of the present disclosure, the rules may be based on specific needs of the regulatory provisions to validate compliance need for the smart contract.

According to a further aspect of the present disclosure, the local database may be embedded within the block chain node device and the block chain ledger may be stored on the local database.

According to yet another aspect of the present disclosure, the block chain ledger may be stored on the external database, but the disclosure is not limited thereto.

According to another aspect of the present disclosure, a system for implementing a block chain node device for facilitating regulatory compliance for contracts, is disclosed. The system may include: a processor; an external database external to a block chain node device managed and operated by an organization; a local database; and a communication network. The processor may be configured to: establish a link between the external database and the local database via the communication network; receive a smart contract from the local database, the smart contract comprising a digital model of a contract that describes base policy between the organization and a client; host the received smart contract on a block chain ledger; receive a side car contract from the external database, the side car contract comprising a digital addendum to the smart contract and one or more modifications to one or more terms of the contract according to one or more regulatory provisions; attach the side car contract to the smart contract; and cause a graphical user interface (GUI) to report the one or more terms of the contract according to the one or more modifications in the side car contract in response to one or more received requests to thereby facilitate compliance with the regulatory provisions.

According to a further aspect of the present disclosure, the processor may be further configured to: determine when one or more of the modifications should be updated based on one or more blocks added to the block chain ledger corresponding to new regulatory provisions received from the external database; record one or more updates to the one or more of the modifications based on the determination that one or more of the modifications should be updated; and cause the graphical user interface (GUI) to report the one or more terms of the contract according to the updated one or more modifications in the side car contract in response to one or more received requests to thereby facilitate compliance with the new regulatory provisions.

According to yet another aspect of the present disclosure, the processor may be further configured to: establish a link between a plurality of block chain devices; and synchronize the plurality of block chain devices with the updated one or more modifications in the side car contract.

According to a further aspect of the present disclosure, the external database may be embedded within an authority data source that stores regulatory provisions, and the processor may be further configured to: obtain the side car contract from the authority data source, wherein the side car contract is programmatically configured to: obtain entitlement data from the authority data source via the communication network; and determine when the one or more modifications should be updated based on the obtained entitlement data.

According to another aspect of the present disclosure, a non-transitory computer readable medium configured to store instructions for implementing a block chain node device for facilitating regulatory compliance for contracts is disclosed. The instructions, when executed, may cause a processor to perform the following: establishing a link between an external database external to a block chain node device managed and operated by an organization and a local database via a communication network; receiving a smart contract from the local database, the smart contract comprising digital model of a contract that describes base policy between the organization and a client; hosting the received smart contract on a block chain ledger; receiving a side car contract from the external database, the side car contract comprising a digital addendum to the smart contract and one or more modifications to one or more terms of the contract according to one or more regulatory provisions; attaching the side car contract to the smart contract; and causing a graphical user interface (GUI) to report the one or more terms of the contract according to the one or more modifications in the side car contract in response to one or more received requests to thereby facilitate compliance with the regulatory provisions.

According to yet another aspect of the present disclosure, the instructions, when executed, may further cause the processor to perform the following: determining when one or more of the modifications should be updated based on one or more blocks added to the block chain ledger corresponding to new regulatory provisions received from the external database; recording one or more updates to the one or more of the modifications based on the determination that one or more of the modifications should be updated; and causing the graphical user interface (GUI) to report the one or more terms of the contract according to the updated one or more modifications in the side car contract in response to one or more received requests to thereby facilitate compliance with the new regulatory provisions.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
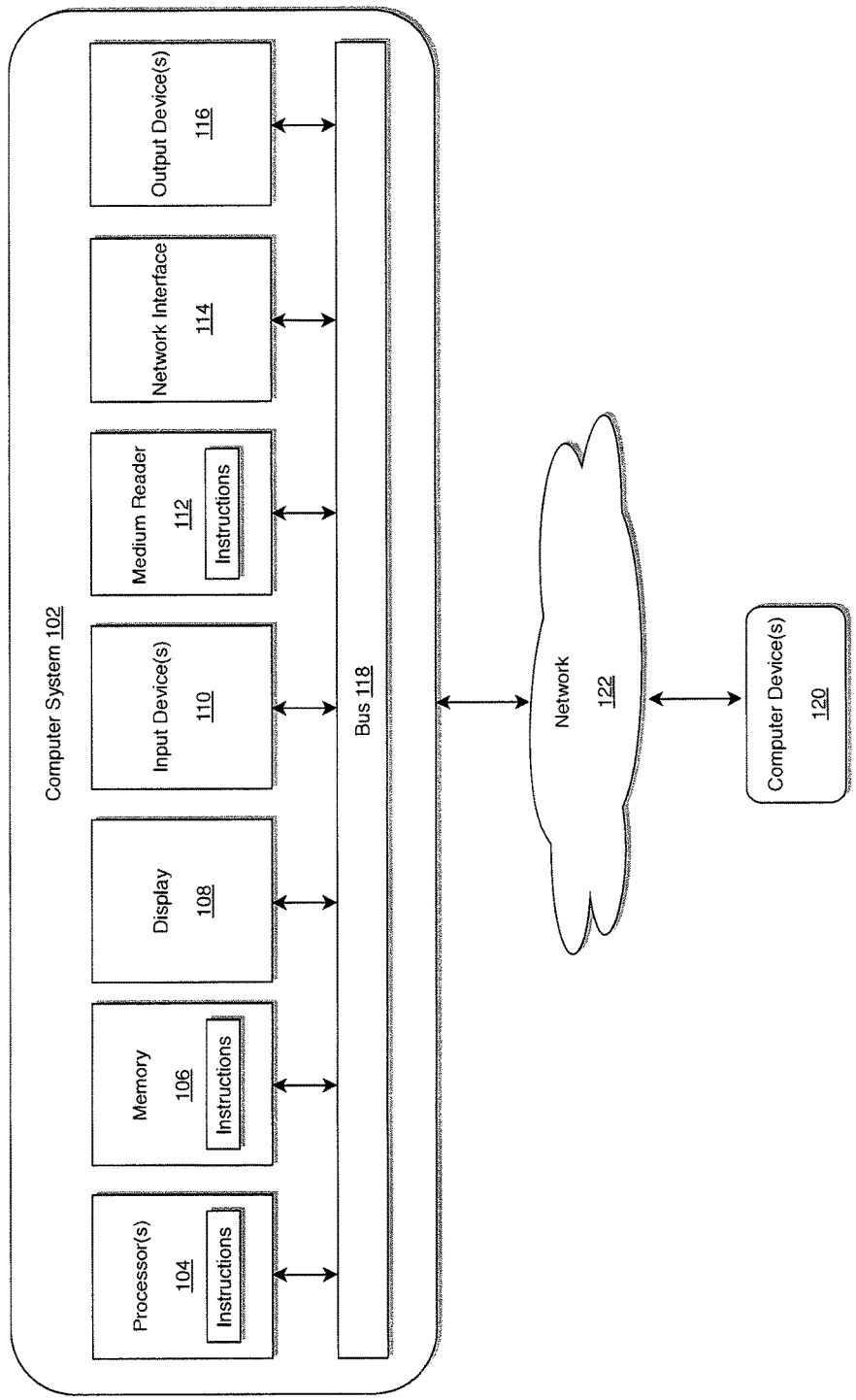
FIG. 1 illustrates a computer system for implementing a block chain node device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a block chain node device including a block chain node module that may be configured for implementing contracts as block chain smart contract and linking/attaching side car contract (e.g., verifiable regulatory rules) to the smart contract, thereby reducing authentication data overhead, eliminating human error from decision making process, allowing institutions to systematically integrate with each other to exchange necessary information, and providing a platform for compliance with regulations that would be easily provable through trusted, verifiable, and auditable nature of the block chain architecture of the smart contract and the side car contract, but the disclosure is not limited thereto.

Figure 2:
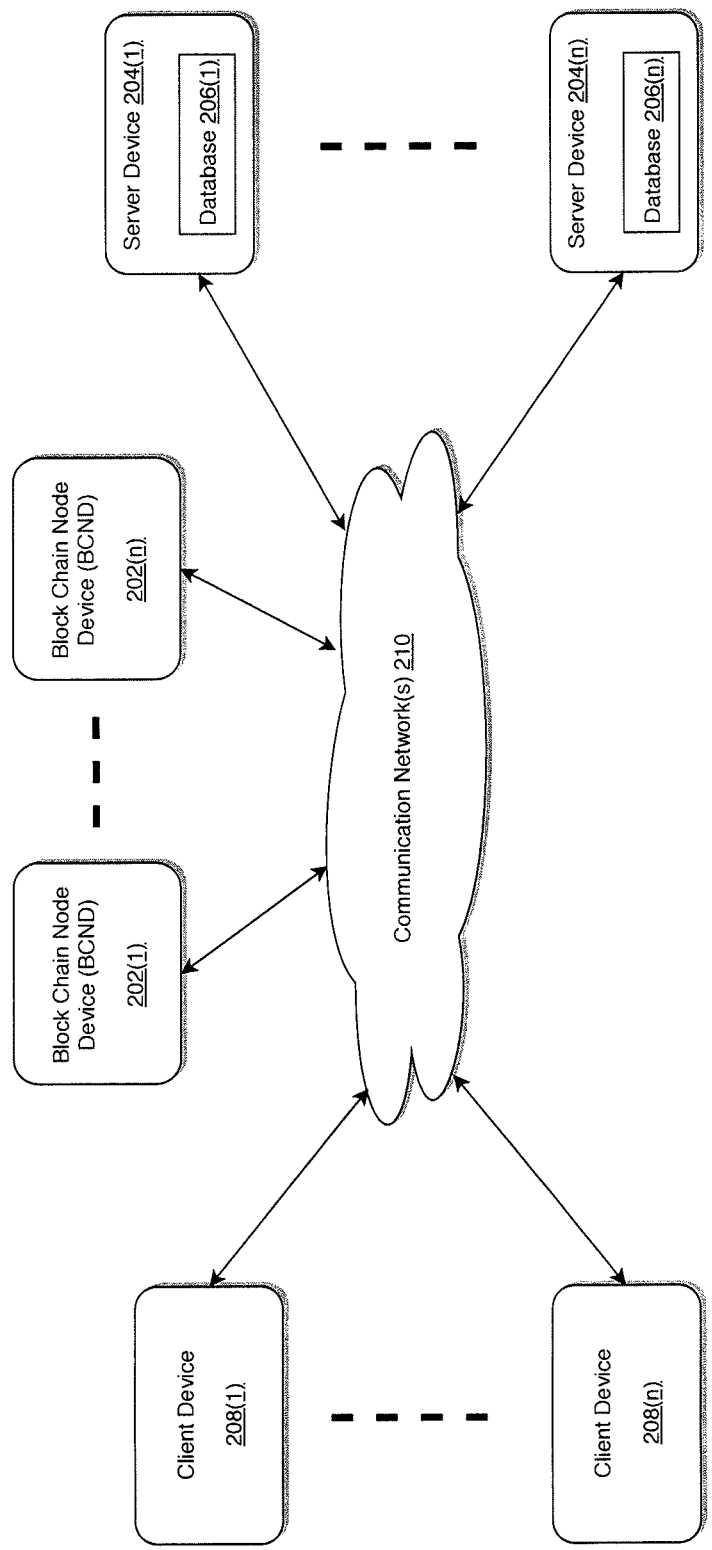
FIG. 2 illustrates an exemplary diagram of a network environment with a block chain node device in accordance with an exemplary embodiment.

Referring to FIG. 2, a schematic of an exemplary network environment 200 for implementing a block chain node device having a block chain node module (BCNM) of the instant disclosure is illustrated.

Conventional system, that does not implement a BCNM of the instant disclosure, may not be able to ensure regulation compliance in an automatic and efficient manner. For example, conventionally, such compliance often depends solely on manual processing which may result in errors as well as such conventional technique may often prove be time consuming thereby wasting of computer resources that could be otherwise utilized in other processes. Thus, the conventional system, that does not implement a BCNM of the instant disclosure, may not be able to ensure regulation compliance in an automatic and efficient manner.

According to exemplary embodiments, the above-described problems associated with conventional system may be overcome by implementing a block chain node device (BCND) 202 having a BCNM as illustrated in FIG. 2. The BCND 202 may be the same or similar to the computer system 102 as described with respect to FIG. 1.

The BCND 202 may store one or more applications that can include executable instructions that, when executed by the BCND 202, cause the BCND 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the BCND 202 itself, may be located in virtual server(s) running in a cloud-based computing environment rather than being tied to one or more specific physical network computing devices. Also, the application(s) may be running in one or more virtual machines (VMs) executing on the BCND 202. Additionally, in one or more embodiments of this technology, virtual machine(s) running on the BCND 202 may be managed or supervised by a hypervisor.

In the network environment 200 of FIG. 2, the BCND 202 is coupled to a plurality of server devices 204(1)-204(n) that hosts a plurality of databases 206(1)-206(n), and also to a plurality of client devices 208(1)-208(n) via communication network(s) 210. A communication interface of the BCND 202, such as the network interface 114 of the computer system 102 of FIG. 1, operatively couples and communicates between the BCND 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used. According to exemplary embodiments, the BCND 202 may be configured to send code at run-time to remote server devices 204(1)-204(n), but the disclosure is not limited thereto.

The communication network(s) 210 may be the same or similar to the network 122 as described with respect to FIG. 1, although the BCND 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The BCND 202 may be a standalone device or integrated with one or more other devices or apparatuses, such as one or more of the server devices 204(1)-204(n), for example. In one particular example, the BCND 202 may be hosted by one of the server devices 204(1)-204(n), and other arrangements are also possible. Moreover, one or more of the devices of the BCND 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the BCND 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the BCND 202 that may be configured for implementing contracts as block chain smart contract and linking/attaching side car contract (e.g., verifiable regulatory rules) to the smart contract, thereby reducing utilization of computer resources and ensuring regulation compliance in an automatic and efficient manner, but the disclosure is not limited thereto. According to exemplary embodiments, the client devices 208(1)-208(n) in this example may further include any type of computing device that can facilitate the implementation of the BCND 202 including the BCNM that may be configured for implementing contracts as block chain smart contract and linking/attaching side car contract (e.g., verifiable regulatory rules) to the smart contract, thereby reducing authentication data overhead, eliminating human error from decision making process, allowing institutions to systematically integrate with each other to exchange necessary information, and providing a platform for compliance with regulations that would be easily provable through trusted, verifiable, and auditable nature of the block chain architecture of the smart contract and the side car contract, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the BCND 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the BCND 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the BCND 202, the server devices 204(1)-204(n), or the client devices 208(1)-208(n), for example, may be configured to operate as virtual instances on the same physical machine. For example, one or more of the BCND 202, the server devices 204(1)-204(n), or the client devices 208(1)-208(n) may operate on the same physical device rather than as separate devices communicating through communication network(s) 210. Additionally, there may be more or fewer BCNDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
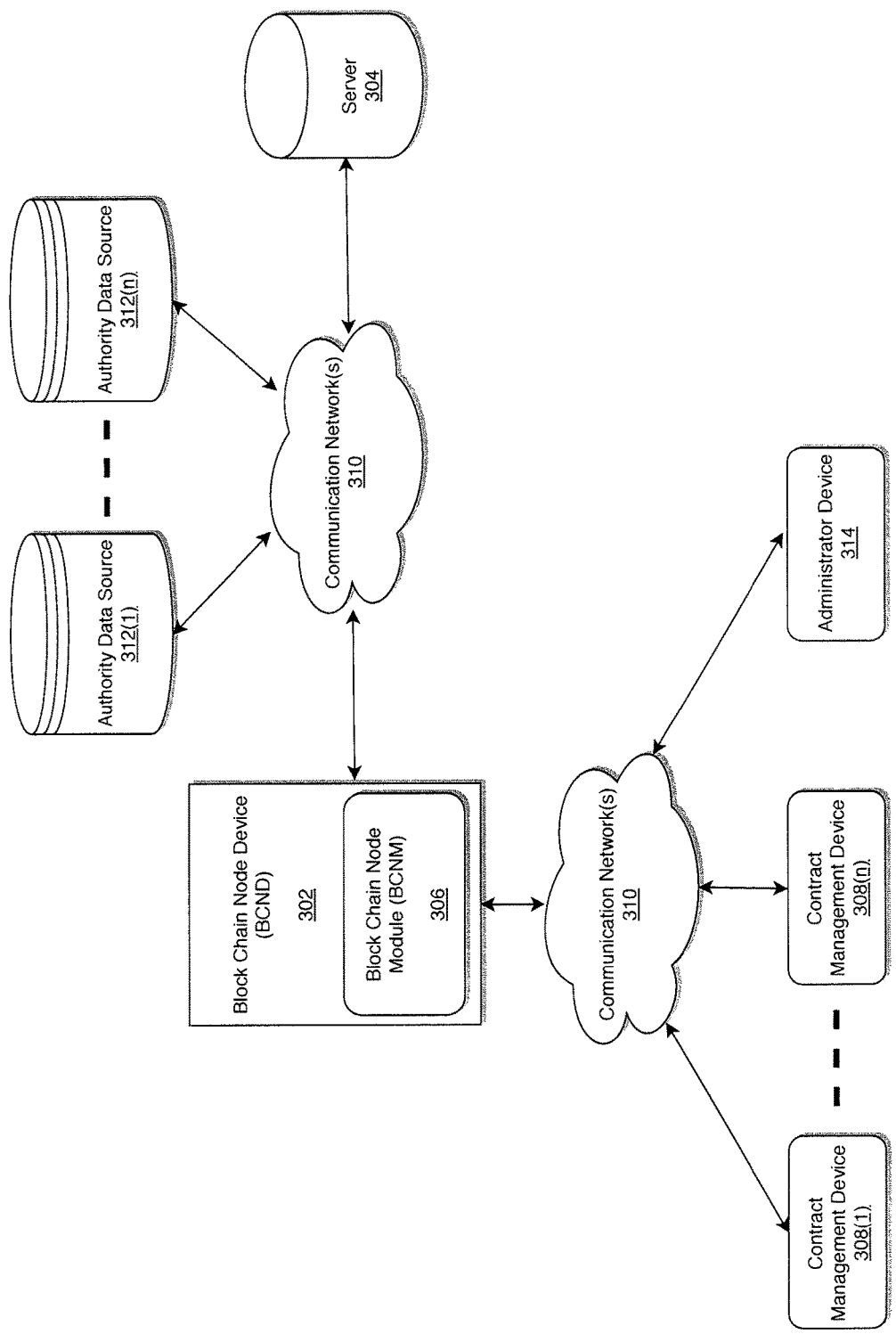
FIG. 3 illustrates a system diagram for implementing a block chain node device with a block chain node module in accordance with an exemplary embodiment.

FIG. 3 illustrates a system diagram for implementing a block chain node device (BCND) with a block chain node module (BCNM) in accordance with an exemplary embodiment.

As illustrated in FIG. 3, the BCND 302 including the BCNM 306 may be connected to a server 304, one or more authority data sources 312(1)-312(n), one or more contract management devices 308(1)-308(n), and an administrator device 314 via a communication network 310, but the disclosure is not limited thereto.

According to exemplary embodiment, the BCND 302 is described and shown in FIG. 3 as including the BCNM 306, although it may include other rules, policies, modules, databases, or applications, for example. The BCND 302 may be the same or equivalent to the computer system 102 as illustrated in FIG. 1 or the BCND(s) 202(1)-202(n) as illustrated in FIG. 2. For example, the BCND 302 may include processor(s), memory, and/or a communication interface, which may be coupled together by a bus 118 (as illustrated in FIG. 1) or other communication link, although the BCND 302 may include other types and/or numbers of elements in other configurations.

According to exemplary embodiments, the BCND 302 may communicate across the communication network(s) 310 to maintain a distributed block chain ledger (see, e.g., FIGS. 5 and 6 details of which will be described later) with a list of data records that each refer to previous records to reduce tampering and revision, among other benefits. The content of the block chain ledger in this particular exemplary embodiment may include smart contracts and side car contracts that digitally model contracts, such as financial institution loans, and addendums to such contracts, as described and illustrated in more detail later, but the disclosure is not limited thereto.

According to exemplary embodiments, the processor(s) of the BCND 302 may execute programmed instructions stored in the memory for the any number of the functions described and illustrated herein. The processor(s) of the BCND 302 may include one or more CPUs or general purpose processors with one or more processing cores, for example, although other types of processor(s) can also be used. According to exemplary embodiments, each of the authority data sources 312(1)-312(n) may be a server device or a database as illustrated in FIGS. 1-2.

The process may be executed via the communication network 310, which may comprise plural networks as described above. For example, in an exemplary embodiment, the contract management devices 308(1)-308(n) may communicate with the BCND 302 via broadband or cellular communication. Of course, these embodiments are merely exemplary and are not limiting or exhaustive.

Figure 4:
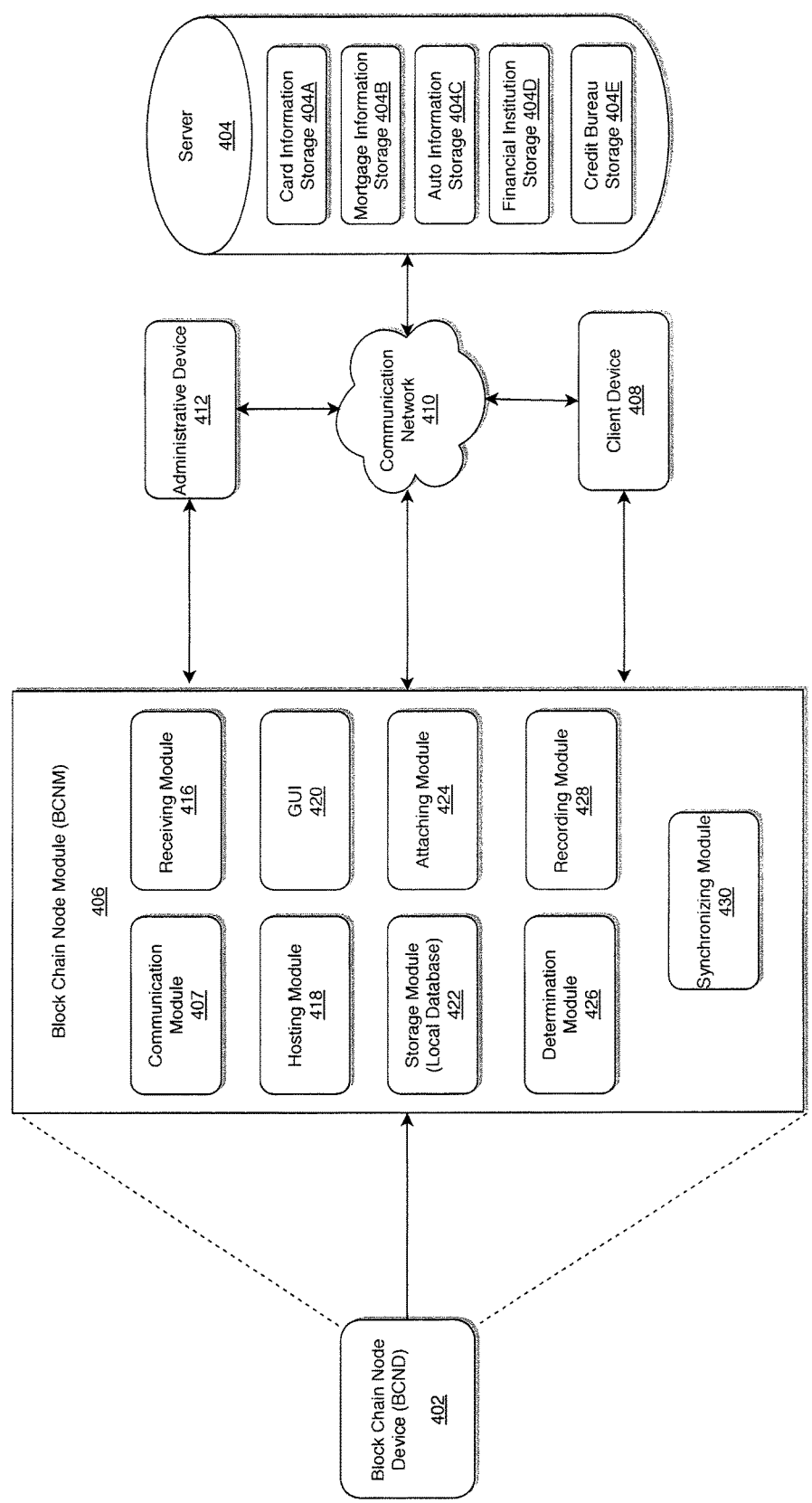
FIG. 4 illustrates a system diagram for implementing a block chain node module of FIG. 3 in accordance with an exemplary embodiment.

FIG. 4 illustrates a system diagram for implementing a block chain node module of FIG. 3 in accordance with an exemplary embodiment.

As illustrated in FIG. 4, according to exemplary embodiments, the system 400 may include a BCND 402 within which a BCNM 406 may be embedded, a server 404, an administrative device 412, a client device 408, and a communication network 410.

As illustrated in FIG. 4, the BCNM 406 may include a communication module 407, a receiving module 416, a hosting module 418, a graphical user interface (GUI) 420, a storage module (e.g., a local database) 422, an attaching module 424, a determination module 426, a recording module 428, and a synchronizing module 430, but the disclosure is not limited thereto.

Referring to FIGS. 3-4, according to exemplary embodiments, authority data sources 312(1)-312(n), contract management devices 308(1)-308(n), the client device 408, and the server 404 may be external to the BCND 402, but the disclosure is not limited thereto. For example, the contract management devices 308(1)-308(n) may be embedded within the BCND 402. The BCND 402 may include various systems that are managed and operated by an organization.

Referring again to FIGS. 3-4, the client device 408 may be "clients" of the BCND 402 and are described herein as such. Nevertheless, it is to be known and understood that the client device 408 need not necessarily be "clients" of the BCND 302, or any entity described in association therewith herein. Any additional or alternative relationship may exist between the client device 408 and the BCND 402, or no relationship may exist.

According to exemplary embodiments, the client device 408 may be, for example, a smart phone or a personal computer (PC). Of course, the client device 408 may also be any additional device described herein. According to exemplary embodiments, the server 404 may be the same or equivalent to the server device 204 as illustrated in FIG. 2 or the server 304 as illustrated in FIG. 3.

The process may be executed via the communication network 410, which may comprise plural networks as described above. For example, in an exemplary embodiment, the various components of the BCNM 406 may communicate with the server 404, the administrative device 412, and the client device 408 via the communication module 407 and the communication network 410. Of course, these embodiments are merely exemplary and are not limiting or exhaustive.

According to exemplary embodiments, the server 404 may include, a card information storage 404A, a mortgage information storage 404B, an auto information storage 404C, a financial institution storage 404D, and a credit bureau storage 404E, but the disclosure is not limited thereto. The card information storage 404A may store data relating to card transaction and/or contract between a card holder (e.g., a client) and a financial institution. The mortgage information storage 404B may store data relating to a mortgage contract between a client and a financial institution. The auto information storage 404C may store data relating to an auto loan contract between a client and a financial institution. The financial institution storage 404D may store data related one or more contracts between a client and the financial institution. The credit bureau storage 404E may store data relating to a client's credit information, but the disclosure is not limited thereto. Although in FIG. 4, the card information storage 404A, the mortgage information storage 404B, the auto information storage 404C, the financial institution storage 404D, and the credit bureau storage 404E are illustrated to be embedded within one server 404, the disclosure is not limited thereto. For example, each storage may be embedded within its own server or may be shared between one or more servers.

According to exemplary embodiments, the system 400 as illustrated in FIG. 4 may be configured to implement a block chain node device for facilitating regulatory compliance for contracts.

Referring to FIGS. 3-4, according to exemplary embodiments, the communication module 407 may be configured to establish a communication link between an external database external to the BCND 402 and a storage module 422 (e.g., a local database) via the communication network 410. According to exemplary embodiments, the BCND 402 may be managed and operated by an organization, e.g., a financial institution, and the external database may be the same or equivalent to the authority data source 312(1)-312(n).

According to exemplary embodiments, the receiving module 416 may be configured to receive a smart contract from the storage module 422 which may be in communication with the server 404 to obtain contract information from one or more of the card information storage 404A, the mortgage information storage 404B, the auto information storage 404C, the financial institution storage 404D, and/or the credit bureau storage 404E.

According to exemplary embodiments, the smart contract may comprise a digital model of a contract that describes base policy between the organization and a client. For example, the storage module 422 of the BCNM 406 may include smart contracts and side car contracts hosted by, published to, and/or propagated via a block chain ledger.

For example, the hosting module 418 may be configured to host the received smart contract on a block chain ledger. The receiving module 416 may be further configured to receive a side car contract from the external database. According to exemplary embodiments, the side car contract may comprise a digital addendum to the smart contract and one or more modifications to one or more terms of the contract according to one or more regulatory provisions. The regulatory provisions may be obtained from the authority data sources 312(1)-312(n).

According to exemplary embodiments, the attaching module 424 may be configured to attach the side car contract to the smart contract, and the graphical user interface (GUI) 420 may be configured to display a report of the one or more terms of the contract according to the one or more modifications in the side car contract in response to one or more received requests to thereby facilitate compliance with the regulatory provisions.

Figure 5:
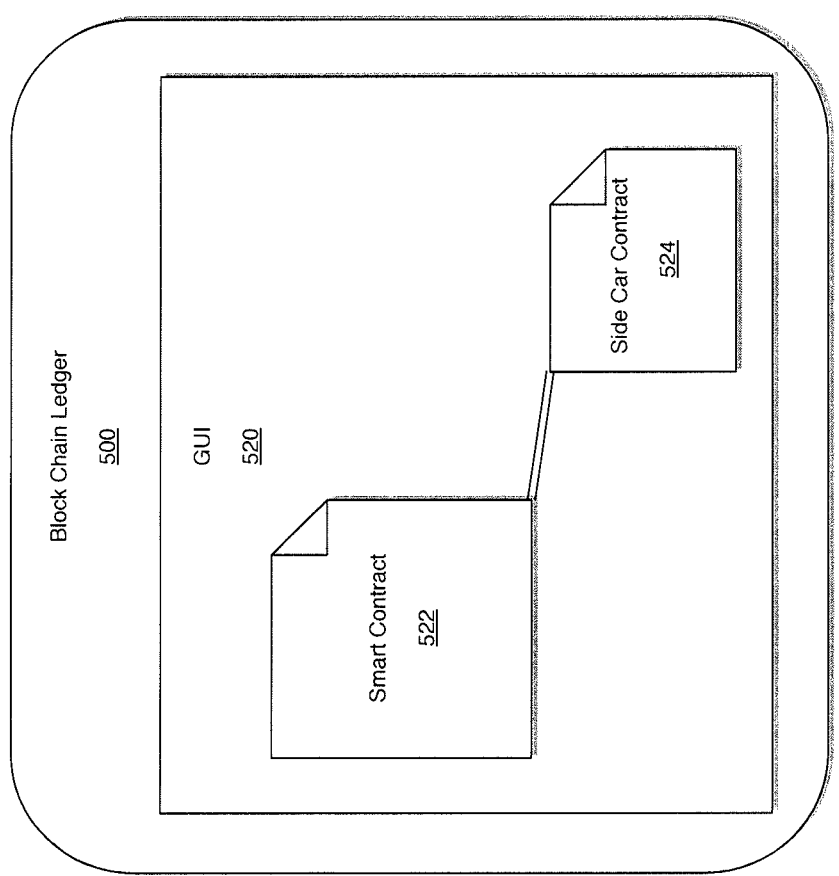
FIG. 5 illustrates a graphical user interface of FIG. 4 in accordance with an exemplary embodiment.

For example, FIG. 5 illustrates a graphical user interface of FIG. 4 in accordance with an exemplary embodiment. As illustrated in FIG. 5, the smart contract 522 is hosted by the block chain ledger 500 and the GUI 520 illustrates that a side car contract 524 is attached/linked to the smart contract 522.

According to exemplary embodiments, each of the side car contracts may include a digital addendum to one of the loan contract and modifications to terms of the loan contract according to regulatory provisions. For example, the side car in this example may include a digital addendum to a mortgage loan contract and modifications to terms of the mortgage loan contract according to SCRA regulatory provisions (e.g., requiring the mortgage rate to remain fixed and restricting foreclosure). One of the contract management devices 308(1)-308(n) associated with the financial institution originating the mortgage may then interact with the smart contracts 522 hosted by the block chain ledger 500 to obtain mortgage loan terms during processing. Thereby, compliance with the SCRA may be advantageously guarantee and provable using the block chain ledger 500.

In some examples, one or more of the smart contracts may include the digital addendum to a loan contract, and modifications to terms of the loan contract according to regulatory provisions, and a side car may not be utilized.

Figure 6:
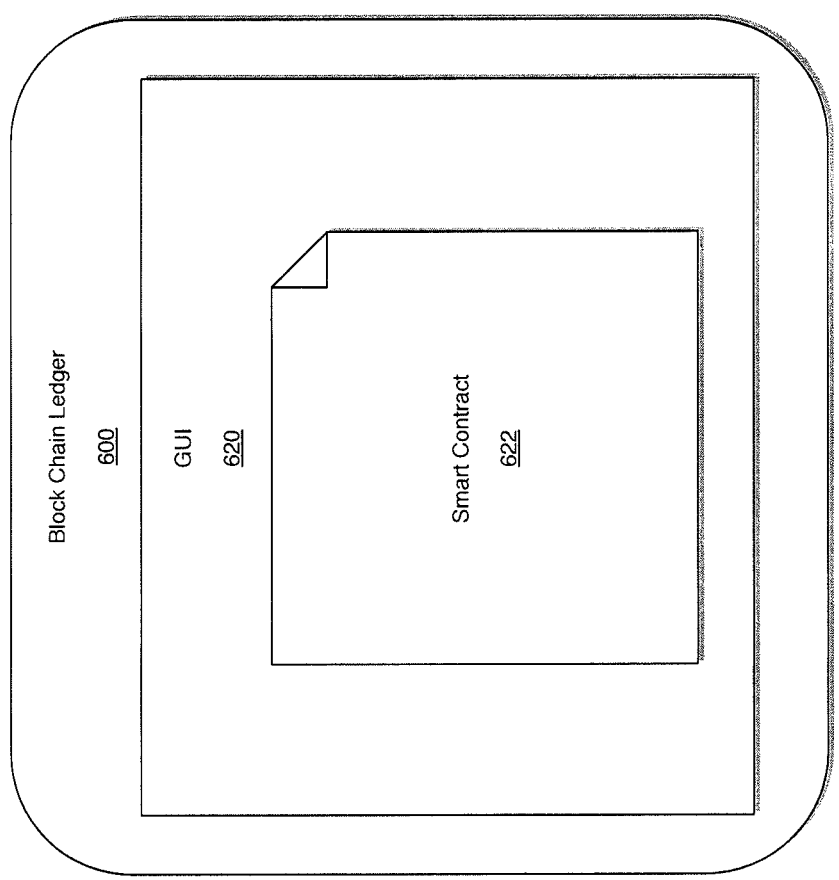
FIG. 6 illustrates a graphical user interface of FIG. 4 in accordance with another exemplary embodiment.

For example, FIG. 6 illustrates a graphical user interface of FIG. 4 in accordance with another exemplary embodiment. As illustrated in FIG. 6, the smart contract 622 is hosted by the block chain ledger 600 and the GUI 620 illustrates that no side car contract is being attached/linked to the smart contract 622.

Referring more specifically to FIGS. 4 and 6, a block diagram of a system is illustrated for facilitating regulatory compliance for contracts in which the block chain ledger 600 may be managed by a regulator or authority that utilizes the authority data sources 312(1)-312(n) and/or the administrative device 412. The regulator in this example may be the Federal Reserve, Office of the Comptroller of the Currency, or Consumer Financial Protection Bureau, although other regulators may also manage the block chain ledger 600 in other examples. The smart contract 622 may be published by the regulatory recognized authority, such as the Department of Defense, which is associated with the authority data sources 312(1)-312(n).

Accordingly, the smart contract 622 in this example may correspond to the side car contract described and illustrated in more detail earlier with reference to FIG. 5, but may not be attached/linked to another smart contract within the block chain ledger 600 managed by the regulator. Instead, the financial institutions (i.e., contract management devices 308(1)-308(*n*)) leverage the smart contract data as propagated to their linked block chain ledgers to match against data maintained by their contract management devices 308(1)-308(*n*) to facilitate compliance with regulatory provisions. Advantageously, the regulator in this example is responsible for maintaining the smart contracts 622 and associated block chain ledger 600 thereby effectively delegating regulatory compliance to the regulator and the Department of Defense, which is a regulatory-recognized authority. As a result, with the instant technology as described herein, regulatory violations by financial institutions may be significantly reduced and human error may be eliminated from decision-making processes relating to compliance with regulatory provisions.

Additionally, according to exemplary embodiments, updates to entitlement may be received from a client (e.g., a service member), and the BCND 402 may receive and records the updates from a banker using the administrative device 412. In this exemplary embodiment, the banker may utilize the administrative device 412 to communicate with the BCNM 406 with update data (e.g., a client's service status updates) input by a client by utilizing the client device 408 and received by the administrative device 412. According to exemplary embodiments the administrative device 412 may also send updates on regulatory provisions to the BCNM 406.

For example, the determination module 426 may be configured to determine when one or more of the modifications should be updated based on one or more blocks added to the block chain ledger 500 corresponding to new regulatory provisions received from the external database. The recording module 426 may be configured to record one or more updates to the one or more of the modifications based on the determination that one or more of the modifications should be updated. And the GUI 420 may be configured to report the one or more terms of the contract according to the updated one or more modifications in the side car contract 524 in response to one or more received requests to thereby facilitate compliance with the new regulatory provisions.

According to exemplary embodiments, the communication module 407 may be configured to establish a link between a plurality of block chain devices 202(1)-202(*n*), and the synchronizing module 430 may be configured to synchronize the plurality of block chain devices 202(1)-202(*n*) with the updated one or more modifications in the side car contract 524.

According to exemplary embodiments, the external database may be embedded within an authority data source 312(1) that stores regulatory provisions, and the receiving module 416 may be configured to obtain the side car contract 524 from the authority data source 312(1). The side car contract 524 may be programmatically configured to obtain entitlement data from the authority data source 312(1) via the communication network 410 by utilizing the receiving module 416. The determination module 426 may be configured to determine when the one or more modifications should be updated based on the obtained entitlement data.

According to exemplary embodiments, a non-transitory computer readable medium may be configured to store instructions for implementing a block chain node device for facilitating regulatory compliance for contracts. The instructions, when executed, may cause a processor embedded within the BCND 402 to perform the following: establishing a link between an external database external to a block chain node device managed and operated by an organization and a local database via a communication network; receiving a smart contract from the local database, the smart contract comprising a digital model of a contract that describes base policy between the organization and a client; hosting the received smart contract on a block chain ledger; receiving a side car contract from the external database, the side car contract comprising a digital addendum to the smart contract and one or more modifications to one or more terms of the contract according to one or more regulatory provisions; attaching the side car contract to the smart contract; and causing a graphical user interface (GUI) to report the one or more terms of the contract according to the one or more modifications in the side car contract in response to one or more received requests to thereby facilitate compliance with the regulatory provisions.

According to exemplary embodiments, the instructions, when executed, may further cause the processor embedded within the BCND 402 to perform the following: determining when one or more of the modifications should be updated based on one or more blocks added to the block chain ledger corresponding to new regulatory provisions received from the external database; recording one or more updates to the one or more of the modifications based on the determination that one or more of the modifications should be updated; and causing the graphical user interface (GUI) to report the one or more terms of the contract according to the updated one or more modifications in the side car contract in response to one or more received requests to thereby facilitate compliance with the new regulatory provisions.

Figure 7:
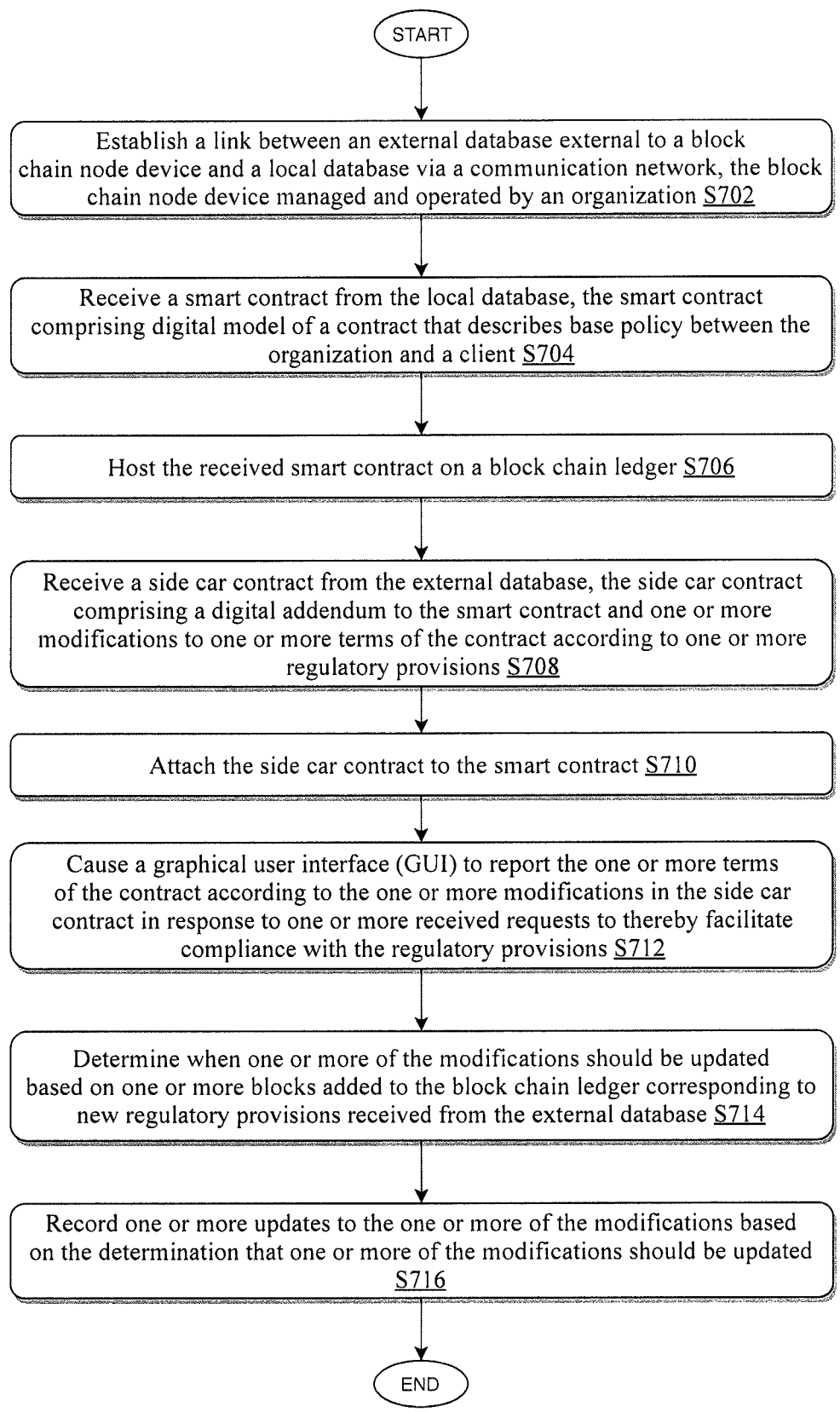
FIG. 7 illustrates a flow chart for implementing a block chain node device in accordance with an exemplary embodiment.

FIG. 7 illustrates a flow chart for implementing a block chain node device in accordance with an exemplary embodiment.

In the process 700 of FIG. 7, at step S702, a communication link may be established between an external database external to a block chain node device and a local database via a communication network. The block chain node device may be managed and operated by an organization, e.g., a financial institution, but the disclosure is not limited thereto. According to exemplary embodiments, the external database may be the same or similar to the authority data sources 312(1)-312(*n*) and/or the administrative device 412 as illustrated herein with respect to FIGS. 3 and 4, the block chain node device may be the same as or similar to the BCND as illustrated herein with respect to FIGS. 3 and 4, and the local database may be the same or similar to storage module (local database) 422 as illustrated herein with respect to FIG. 4, and the network may be the same or similar to the communication network as illustrated herein with respect to FIGS. 1-4, but the disclosure is not limited thereto.

At step S704, a smart contract from the local database may be received. The smart contract may include a digital model of a contract that describes base policy between the organization and a client (i.e., a service member).

At step S706, a block chain ledger may host the received smart contract. An exemplary block chain ledger is illustrated in FIGS. 5-6.

At step S708, a side car contract may be received from the external database.

At step S710, the side car contract may be attached/linked to the smart contract. As illustrated in FIG. 5, the GUI 530 shows that the side car contract 524 is being attached/linked to the smart contract 522.

According to exemplary embodiments, the side car contract may include a digital addendum to the smart contract and one or more modifications to one or more terms of the contract according to one or more regulatory provisions, but the disclosure is not limited thereto. For example, the side car contract in this example may model a digital addendum to a loan contract based on an entitlement that modifies terms of the loan contract. In some examples, the side car contract may be obtained from one of the contract management devices 308(1)-308(n) or the administrative device 412 associated with a financial institution that originated the loan that is modeled by the linked smart contract.

In other examples, the side car contract may be obtained as published by one of the authority data sources 312(1)-312(n). Alternatively, according to other exemplary embodiments, the side car contract may be obtained from other sources that may store rules and regulatory updates pertaining to a contract. Accordingly, the side car contract may indicate that particular terms of the loan contract are to remain in place for a specified period of time or any other data that may impact or modify the terms or processing of the loan contract, but the disclosure is not limited thereto.

At step S712, a GUI may report the one or more terms of the contract according to the one or more modifications in the side car contract in response to one or more received requests to thereby facilitate compliance with the regulatory provisions.

At step S714, a determination is made as to when one or more of the modifications should be updated based on one or more blocks added to the block chain ledger corresponding to new regulatory provisions received from the external database.

At step S716, one or more updates to the one or more of the modifications based on the determination that one or more of the modifications should be updated may be recorded. The GUI may then report the one or more terms of the contract according to the updated one or more modifications in the side car contract in response to one or more received requests to thereby facilitate compliance with the new regulatory provisions.

According to exemplary embodiments, the process 700 may further include: establishing a link between a plurality of block chain devices; and synchronizing the plurality of block chain devices with the updated one or more modifications in the side car contract.

According to exemplary embodiments, the external database may be embedded within an authority data source that stores regulatory provisions, and the process 700 may further include: obtaining the side car contract from the authority data source, wherein the side car contract is programmatically configured to: obtain entitlement data from the authority data source via the communication network; and determine when the one or more modifications should be updated based on the obtained entitlement data.

According to exemplary embodiments, the entitlement data may include identification data that validates contract data of the smart contract. According to exemplary embodiments, the identification data may include last name, first name, social security number, or any other identification information that identifies a client to the contract, but the disclosure is not limited thereto.

According to exemplary embodiments, the side car contract may include built-in intelligence to implement the one or more modifications programmatically as rules based on data collected from the external database.

According to exemplary embodiments, the rules may be based on specific needs of the regulatory provisions to validate compliance need for the smart contract.

According to exemplary embodiments, the local database may be embedded within the block chain node device and the block chain ledger may be stored on the local database.

According to exemplary embodiments, the block chain ledger may be stored on the external database, but the disclosure is not limited thereto.

According to the process 700 of the exemplary embodiment, the block chain node device may record a result of the update in the block chain ledger. Recording the update in this example may include attaching another side car contract to the smart contract or modifying the attached side car to reflect the update, for example. Subsequent to recording the update, or if the block chain node device determines in step S714 that an update is not received, then the block chain node device may determine whether a data request has been received, such as data regarding an entitlement that is reflected by the side car contract. The request may be received from one of the contract management devices that may be processing the loan contract to determine whether there is an applicable entitlement that would otherwise prevent the adjustment term in the loan contract, for example, although the data request may be received from other sources and may relate to different types of data. If the block chain node device determines in step S714 that a data request is not received, then no recording is performed in step S716.

However, if the block chain node device determines in step S714 that a data request has been received, then the block chain node device may report data regarding the loan contract terms based on the side car contract and in response to the received data request in step S716. Accordingly, in one example, the block chain node device may analyze the side car contract and determine that an entitlement still exists for the loan contract, and may report the same to a requesting one of the contract management devices 308(1)-308(n) to prevent modification of the loan terms in contravention to an associated regulatory provision relating to the entitlement.

According to exemplary embodiments, the format of the side car contract may be standardized as published by the authority data source 312(1)-312(n), and the block chain ledger therefore may not be proprietary or associated with any particular financial institution. Advantageously, entitlement updates in this example may be automatically recorded in the block chain ledger, thereby further improving regulatory compliance.

According to exemplary embodiments, the block chain ledger illustrated in FIG. 5 and/or FIG. 6 may be housed and/or managed by a subset of the block chain nodes associated with a regulator charged with ensuring compliance with regulatory provisions, although copies of the block chain ledger may be stored by another one or more subsets of the block chain nodes that are each associated with a financial institution.

The present disclosure, through one or more of its various aspects, embodiments, and/or specific features or sub-components, provides, among others, various systems, servers, devices, methods, media, programs, and platforms described herein with reference to FIGS. 1-7 for implementing a block chain node device including a block chain node module that may be configured for implementing contracts as block chain smart contract and linking/attaching side car contract (e.g., verifiable regulatory rules) to the smart contract, thereby reducing utilization of computer resources and ensuring regulation compliance in an automatic and efficient manner, but the disclosure is not limited thereto.

The present disclosure, through one or more of its various aspects, embodiments, and/or specific features or sub-components, further provides, among others, various systems, servers, devices, methods, media, programs, and platforms described herein with reference to FIGS. 1-7 for implementing a block chain node device including a block chain node module that may be configured for implementing contracts as block chain smart contract and linking/attaching side car contract (e.g., verifiable regulatory rules) to the smart contract, thereby reducing authentication data overhead, eliminating human error from decision making process, allowing institutions to systematically integrate with each other to exchange necessary information, and providing a platform for compliance with regulations that would be easily provable through trusted, verifiable, and auditable nature of the block chain architecture of the smart contract and the side car contract, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a block chain node device by utilizing one or more processors and one or more memories, the method comprising:

establishing a link between an external database external to a block chain node device managed and operated by an organization and a local database via a communication network;
receiving a smart contract from the local database, the smart contract comprising a digital model of a contract;
hosting the received smart contract on a block chain ledger;
receiving a side car contract from the external database, the side car contract comprising a digital addendum to the smart contract and one or more modifications data to one or more terms of the contract, wherein the external database is embedded within an authority data source that stores the new data, wherein the side car contract is received from the authority data source, and wherein the side car contract is programmatically configured to obtain entitlement data from the authority data source via the communication network; and determine when the one or more modifications data should be updated based on the obtained entitlement data;
attaching the side car contract to the smart contract;
causing a graphical user interface (GUI) to report the one or more terms of the contract according to the one or more modifications in the side car contract in response to one or more received requests;
determining when one or more of the modifications data should be updated based on one or more blocks added to the block chain ledger corresponding to new data received from the external database;
recording one or more updates data to the one or more of the modifications data based on the determination that one or more of the modifications data should be updated; and
causing the graphical user interface (GUI) to report the one or more terms of the contract according to the updated one or more modifications data in the side car contract in response to one or more received requests;
establishing a link between a plurality of block chain devices; and
synchronizing the plurality of block chain devices with the updated one or more modifications data in the side car contract,
wherein the block chain ledger is a distributed block chain ledger and the method further includes:
communicating, by the block chain node device, across the communication network to maintain the distributed block chain ledger with a list of data records that each refer to previous records to reduce tampering and revision, wherein content of the block chain ledger is formed by integrating the smart contract and the side car contract that digitally models a contract, thereby reducing authentication data overhead and reducing utilization of computer resources in an automatic and efficient manner, and
wherein the side car contract includes built-in intelligence to implement the one or more modifications data programmatically as rules based on data collected from the external database, and
managing the block chain ledger at least by three authority data sources; and
publishing the smart contract by a computing device associated with the at least three authority data sources.

2. The method according to claim 1, wherein the authority data source stores regulatory provisions data and the new data that includes updates to the regulatory provisions data.

3. The method according to claim 2, wherein the entitlement data includes identification data that validates contract data of the smart contract,
wherein the at least three authority data sources include a first data source utilized by Federal Reserve, a second data source utilized by Office of the Comptroller, and a third data source utilized by Consumer Financial Protection Bureau, and
wherein the computing device is utilized by Department of Defense.

4. The method according to claim 2, wherein the rules are based on specific needs of the regulatory provisions to validate compliance need for the smart contract.

5. The method according to claim 1, wherein the local database is embedded within the block chain node device and the block chain ledger is stored on the local database.

6. The method according to claim 1, wherein the block chain ledger is stored on the external database.

7. A system for implementing a block chain node device, comprising:
a processor;
an external database external to a block chain node device managed and operated by an organization;
a local database; and
a communication network,
wherein the processor is configured to:
establish a link between the external database and the local database via the communication network;
receive a smart contract from the local database, the smart contract comprising a digital model of a contract;
host the received smart contract on a block chain ledger;
receive a side car contract from the external database, the side car contract comprising a digital addendum to the smart contract and one or more modifications data to one or more terms of the contract, wherein the external database is embedded within an authority data source that stores the new data, wherein the side car contract is received from the authority data source, and wherein the side car contract is programmatically configured to obtain entitlement data from the authority data source via the communication network and determine when the one or more modifications data should be updated based on the obtained entitlement data;
attach the side car contract to the smart contract; and
cause a graphical user interface (GUI) to report the one or more terms of the contract according to the one or more modifications in the side car contract in response to one or more received requests;
determine when one or more of the modifications data should be updated based on one or more blocks added to the block chain ledger corresponding to new data received from the external database;
record one or more updates data to the one or more of the modifications data based on the determination that one or more of the modifications data should be updated;
cause the graphical user interface (GUI) to report the one or more terms of the contract according to the updated one or more modifications data in the side car contract in response to one or more received requests,
establish a link between a plurality of block chain devices; and
synchronize the plurality of block chain devices with the updated one or more modifications data in the side car contract,
wherein the block chain ledger is a distributed block chain ledger and the processor is further configured to:

communicate, by the block chain node device, across the communication network to maintain the distributed block chain ledger with a list of data records that each refer to previous records to reduce tampering and revision, wherein content of the block chain ledger is formed by integrating the smart contract and the side car contract that digitally models a contract, thereby reducing authentication data overhead and reducing utilization of computer resources in an automatic and efficient manner, and wherein the side car contract includes built-in intelligence to implement the one or more modifications data programmatically as rules based on data collected from the external database, and manage the block chain ledger at least by three authority data sources; and publish the smart contract by a computing device associated with the at least three authority data sources.

8. The system according to claim 7, wherein the authority data source stores regulatory provisions data and the new data that includes updates to the regulatory provisions data.

9. The system according to claim 8, wherein the entitlement data includes identification data that validates contract data of the smart contract, wherein the at least three authority data sources include a first data source utilized by Federal Reserve, a second data source utilized by Office of the Comptroller, and a third data source utilized by Consumer Financial Protection Bureau, and wherein the computing device is utilized by Department of Defense.

10. The system according to claim 8, wherein the rules are based on specific needs of the regulatory provisions to validate compliance need for the smart contract.

11. The system according to claim 7, wherein the local database is embedded with the block chain node device and the block chain ledger is stored on the local database.

12. The system according to claim 7, wherein the block chain ledger is stored on the external database.

13. A non-transitory computer readable medium configured to store instructions for implementing a block chain node device, wherein when executed, the instructions cause a processor to perform the following:

establishing a link between an external database external to a block chain node device managed and operated by an organization and a local database via a communication network;

receiving a smart contract from the local database, the smart contract comprising a digital model of a contract;

hosting the received smart contract on a block chain ledger;

receiving a side car contract from the external database, the side car contract comprising a digital addendum to the smart contract and one or more modifications data to one or more terms of the contract, wherein the external database is embedded within an authority data source that stores the new data, wherein the side car contract from the authority data source, and wherein the side car contract is programmatically configured to obtain entitlement data from the authority data source via the communication network; and determine when the one or more modifications data should be updated based on the obtained entitlement data;

attaching the side car contract to the smart contract;

causing a graphical user interface (GUI) to report the one or more terms of the contract according to the one or more modifications in the side car contract in response to one or more received requests;

determining when one or more of the modifications data should be updated based on one or more blocks added to the block chain ledger corresponding to new data received from the external database;

recording one or more updates data to the one or more of the modifications data based on the determination that one or more of the modifications data should be updated; and causing the graphical user interface (GUI) to report the one or more terms of the contract according to the updated one or more modifications data in the side car contract in response to one or more received requests, establishing a link between a plurality of block chain devices; and synchronizing the plurality of block chain devices with the updated one or more modifications data in the side car contract, wherein the block chain ledger is a distributed block chain ledger and wherein when executed, the instructions further cause the processor to perform the following:

communicating, by the block chain node device, across the communication network to maintain the distributed block chain ledger with a list of data records that each refer to previous records to reduce tampering and revision, wherein content of the block chain ledger is formed by integrating the smart contract and the side car contract that digitally models a contract, thereby reducing authentication data overhead and reducing utilization of computer resources in an automatic and efficient manner, and wherein the side car contract includes built-in intelligence to implement the one or more modifications data programmatically as rules based on data collected from the external database, and managing the block chain ledger at least by three authority data sources; and publishing the smart contract by a computing device associated with the at least three authority data sources.

14. The non-transitory computer readable medium according to claim 13, wherein the authority data source stores regulatory provisions data and the new data that includes updates to the regulatory provisions data.

15. The non-transitory computer readable medium according to claim 14, wherein the entitlement data includes identification data that validates contract data of the smart contract, wherein the at least three authority data sources include a first data source utilized by Federal Reserve, a second data source utilized by Office of the Comptroller, and a third data source utilized by Consumer Financial Protection Bureau, and wherein the computing device is utilized by Department of Defense.

16. The non-transitory computer readable medium according to claim 14, wherein the rules are based on specific needs of the regulatory provisions to validate compliance need for the smart contract.

17. The non-transitory computer readable medium according to claim 13, wherein the local database is embedded within the block chain node device and the block chain ledger is stored on the local database.

18. The non-transitory computer readable medium according to claim 13, wherein the block chain ledger is stored on the external database.

* * * * *